United States Patent
Yu

(10) Patent No.: US 8,884,976 B2
(45) Date of Patent: Nov. 11, 2014

(54) IMAGE PROCESSING APPARATUS THAT ENABLES TO REDUCE MEMORY CAPACITY AND MEMORY BANDWIDTH

(75) Inventor: Huan Yu, Chiba (JP)

(73) Assignee: MegaChips Corporation, Osaka-shi (JP)

( * ) Notice: Subject to any disclaimer, the term of this patent is extended or adjusted under 35 U.S.C. 154(b) by 223 days.

(21) Appl. No.: 13/446,431

(22) Filed: Apr. 13, 2012

(65) Prior Publication Data
US 2012/0262467 A1 Oct. 18, 2012

(30) Foreign Application Priority Data

Apr. 14, 2011 (JP) .................................. 2011-090055

(51) Int. Cl.
| | |
|---|---|
| G09G 5/39 | (2006.01) |
| G09G 5/00 | (2006.01) |
| H04N 5/76 | (2006.01) |
| H04N 7/01 | (2006.01) |

(52) U.S. Cl.
CPC ..... *H04N 7/0105* (2013.01); *G09G 2340/0428* (2013.01); *H04N 7/014* (2013.01); *G09G 2340/0435* (2013.01); *G09G 2350/00* (2013.01); *G09G 2340/02* (2013.01); *G09G 5/39* (2013.01); *G09G 2320/106* (2013.01); *H04N 7/0132* (2013.01); *G09G 5/005* (2013.01)
USPC ....................... 345/531; 345/606; 348/231.99

(58) Field of Classification Search
CPC ...... G09G 5/393; G06T 13/00; G06T 3/4007; G06T 15/10; G06T 15/005; G06T 15/04; G02B 27/2214; H04N 5/23212; H04N 5/772; H04N 5/21; H04N 5/144; H04N 7/50; H04N 9/045; H04N 9/735; H03H 17/08
USPC .......................... 345/531, 475, 606–610, 84; 348/231.99, 222.1, 224.1, 607, 701, 348/538; 396/125; 375/240.01
See application file for complete search history.

(56) References Cited

U.S. PATENT DOCUMENTS

| | | | | |
|---|---|---|---|---|
| 5,539,455 | A * | 7/1996 | Makioka | 348/222.1 |
| 6,538,694 | B1 * | 3/2003 | Miyahara et al. | 348/241 |
| 7,903,887 | B2 * | 3/2011 | Sasaki et al. | 382/232 |

(Continued)

FOREIGN PATENT DOCUMENTS

| | | |
|---|---|---|
| JP | A-2008-304763 | 12/2008 |
| JP | A-2009-169257 | 7/2009 |
| JP | A-2011-19037 | 1/2011 |

*Primary Examiner* — Joni Richer
*Assistant Examiner* — Yi Yang
(74) *Attorney, Agent, or Firm* — Oblon, Spivak, McClelland, Maier & Neustadt, L.L.P.

(57) ABSTRACT

An image processing apparatus includes a memory control circuit that stores pixel data in a frame memory, an image processing circuit that processes the pixel data stored in the frame memory, and an output circuit that outputs processed pixel data. The memory control circuit divides the pixel data into upper bit portions and lower bit portions, and a lower bit processing circuit stores the lower bit portions in the frame memory by one of (i) dividing lower bit portion of each of the pixel data into n unit portions and storing corresponding one of n unit portions in the frame memory during each of n successive frame periods, and (ii) dividing pixels constituting each of the frames into n groups and storing the lower bit portions of the pixel data of pixels in corresponding one of n groups in the frame memory during each of n successive frame periods.

17 Claims, 5 Drawing Sheets

Related Art

(56) References Cited

U.S. PATENT DOCUMENTS

| | | | |
|---|---|---|---|
| 2008/0303758 A1* | 12/2008 | Ooishi et al. | 345/84 |
| 2009/0059065 A1* | 3/2009 | Yamasaki | 348/441 |
| 2009/0079751 A1* | 3/2009 | Hendry | 345/581 |
| 2011/0050992 A1* | 3/2011 | Han | 348/452 |
| 2013/0010146 A1* | 1/2013 | Kasahara | 348/222.1 |

* cited by examiner ies.
IMAGE PROCESSING APPARATUS THAT ENABLES TO REDUCE MEMORY CAPACITY AND MEMORY BANDWIDTH This application claims benefit of Japanese Application No. JP-A-2011-90055. The disclosure of the prior application is hereby incorporated by reference in its entirety.

BACKGROUND

This disclosure relates to image processing apparatuses that perform frame rate conversion processing such as double-rate conversion processing by using pixel data, or image data, stored in frame memories. Specifically, this disclosure relates to image processing apparatuses that compress the pixel data, or the image data, before storing in the frame memories.

Image processing apparatuses such as television sets utilizing liquid crystal displays receive a plurality of types of pixel data, e.g., pixel data of each frame, or field, of standard television images, and pixel data of each frame corresponding to each movie frame of film source images. The image processing apparatuses detect the type of the input pixel data and perform conversion processing in accordance with the detected type and generate output pixel data, which is used to display the image.

Recently, image display apparatuses that perform frame rate conversion, such as an apparatus described in Japanese Laid-open Patent JP 2011-19037 (Patent Document 1), which was filed by this applicant, are commercially used. Such apparatuses receive pixel data of each frame with an input frame rate and perform frame rate conversion processing, such as double-rate conversion processing, by inserting interpolated images between successive frames. The frame rate conversion processing is effective to reduce judders in film source images and to improve response of liquid crystal displays to moving images.

Further, in recent years, image display apparatuses that display 10-bit pixel data are widely used to display precise color levels. Image processing apparatuses used in such display apparatuses receive 10 bit pixel data, which may have a total number of bits of 30 bits including 10 bits for each of R (Red), G (Green), and B (Blue) primary colors. Conventionally, image processing apparatuses that perform double-rate conversion operation store the entire bits of the 10-bit input pixel data and 10-bit interpolated pixel data in frame memories.

When displaying moving images, human eyes cannot distinguish between images displayed with 10-bit pixel data and images displayed with 8-bit pixel data. Accordingly, pixel data with 8-bit resolution is sufficient for displaying moving images. When displaying still images, on the other hand, human eyes can clearly distinguish between images displayed with 10-bit pixel data and images displayed with 8-bit pixel data. Accordingly, pixel data with 10-bit resolution is preferably used to display still images.

A technique is proposed to utilize this characteristic of human eyes. That is, as shown in FIG. 7, input 10-bit pixel data is divided into upper 8-bit bit portions and lower bit portions and separately stored in a frame memory. Further, 8-bit interpolated pixel data is generated by only using the upper bit portions of the input pixel data and stored in the frame memory. The 8-bit interpolated pixel data is added with lower 2-bit portions of the input pixel data to generated 10-bit interpolated pixel data, which is used to display the interpolated image.

In the image processing apparatus 50 shown in FIG. 7, a dividing circuit 52 divides 10-bit input pixel data of the current frame into upper 8-bit bit portions and lower 2-bit portions, and separately stores in respective storage areas of a frame memory 56. Interpolated image generation circuit 54 generates upper 8-bit portions of current frame interpolated pixel data from (i) upper 8-bit portions of current frame pixel data input from the dividing circuit 52, and (ii) upper 8-bit portions of previous frame input pixel data read from the frame memory 56. Upper 8-bit portions of current frame interpolated pixel data generated by the interpolated image generation circuit 54 are stored in the frame memory 56.

Then, the adder 58 adds (i) each of upper 8-bit portions of the input pixel data or the interpolated pixel data, which are read from the frame memory 56 in a predetermined order, and (ii) corresponding one of lower 2-bit portions of the input pixel, which are also read from the frame memory 56. Thereby, 10-bit output pixel data is generated.

Japanese Laid-open Patent JP 2008-304763 (Patent Document 2) describes another technique. That is, (i) upper bit portions and lower bit portions of display field data are stored in separate storage areas in a frame memory, and (ii) as the previous frame display data, which is used in moving image emphasis processing unit, only the upper bit portions are read from the frame memory.

However, these prior art image processing apparatuses that perform frame rate conversion operation require storing the entire 10-bit input pixel data in frame memories. Larger memory capacity and wider access bandwidth are required for storing 10-bit pixel data than storing 8-bit pixel data. Accordingly, compression of pixel data is often employed. Specifically, upper bit portions of pixel data can be compressed efficiently. For example, upper 8-bit portions of pixel data may be compressed with a compression ratio of 50% before storing in the frame memory.

On the other hand, it is difficult to compress lower bit portions with a high compression ratio. Accordingly, the lower bit portions are usually stored in the frame memory with no compression. If the upper 8-bit portions are compressed with a compression ratio of 50%, and the lower 2-bit portions are not compressed, the total compression ratio is 40%, which is not high enough.

SUMMARY

It would be advantageous to provide image processing apparatuses that can reduce required memory capacity. It would be further advantageous to provide image processing apparatuses that can reduce memory access bandwidth.

Aspect of this disclosure provides an image processing apparatus that includes a memory control circuit that receives a plurality of pixel data each representing a value of each of a plurality of pixels that constitute each of a plurality of frames during each of a plurality of frame periods and stores the plurality of pixel data in a frame memory, an image processing circuit that processes the plurality of pixel data stored in the frame memory to generate a plurality of processed pixel data, and an output circuit that outputs the plurality of processes pixel data. The memory control circuit includes a dividing circuit that divides each of the plurality of pixel data into an upper bit portion and a lower bit portion other than the upper bit portion to generate a plurality of upper bit portions and a plurality of lower bit portions of the plurality of pixel data, an upper bit processing circuit that stores the upper bit portions in the frame memory, and a lower bit processing circuit that stores the lower bit portions in the frame memory. The image processing circuit generates the plurality of processed pixel data by using the upper bit portions of the plurality of pixel data stored in the frame memory. The lower bit processing circuit stores the lower bit portions in the frame memory by one of: (i) dividing the lower bit portion of each of the plurality of pixel data into n unit portions each including at least one bit, where n is an integer larger than one, and storing corresponding one of the n unit portions of each of the plurality of pixel data in the frame memory during each of n successive ones of the frame periods, and (ii) dividing the plurality of pixels constituting each of the plurality of frames into n groups, and storing the lower bit portions of the plurality of pixel data that represent the values of the plurality of pixels in corresponding one of the n groups in the frame memory during each of n successive ones of the frame periods.

In an example, the lower bit processing circuit includes a time-division circuit that stores the lower bit portion of each of the plurality of pixel data that represent the values of the plurality of pixels in the corresponding one of the n groups in the frame memory in a time-division manner.

In an embodiment, the image processing circuit generates an upper bit portion of each of the plurality of processed pixel data, and the output circuit includes an adder that adds the upper bit portion of each of the plurality of processed pixel data and the lower bit portion of corresponding one of the plurality of pixel data read from the frame memory before the output circuit outputs each of the plurality of processed pixel data.

In another embodiment, the upper bit processing circuit further includes a compression circuit that compresses the upper bit portions and stores compressed upper bit portions in the frame memory.

In an example, the image processing circuit generates a plurality of interpolated pixel data each representing a value of each of a plurality of pixels constituting each of a plurality of interpolated frames that interpolate between the plurality of frames as the plurality of processed pixel data.

Another aspect of this disclosure provides a method of image processing that includes receiving a plurality of pixel data and storing the plurality of pixel data in a frame memory, processing the plurality of pixel data stored in the frame memory to generate a plurality of processed pixel data, and outputting the plurality of processed pixel data. The storing includes dividing each of the plurality of pixel data into an upper bit portion and a lower bit portion other than the upper bit portion to generate a plurality of upper bit portions and a plurality of lower bit portions of the plurality of pixel data, storing the upper bit portions in the frame memory, and storing the lower bit portions in the frame memory. The processing generates the plurality of processed pixel data by using the upper bit portions of the plurality of pixel data stored in the frame memory. Further, the storing of the lower bit portions is performed by one of: (i) dividing the lower bit portion of each of the plurality of pixel data into n unit portions each including at least one bit, where n is an integer larger than one, and storing corresponding one of the n unit portions of each of the plurality of pixel data in the frame memory during each of n successive ones of the frame periods, and (ii) dividing the plurality of pixels constituting each of the plurality of frames into n groups, and storing the lower bit portions of the plurality of pixel data that represent the values of the plurality of pixels in corresponding one of the n groups in the frame memory during each of n successive ones of the frame periods.

Still another aspect of this disclosure provides a system for image processing that includes a frame memory, a memory control circuit, an image processing circuit, and an output circuit.

BRIEF DESCRIPTION OF DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
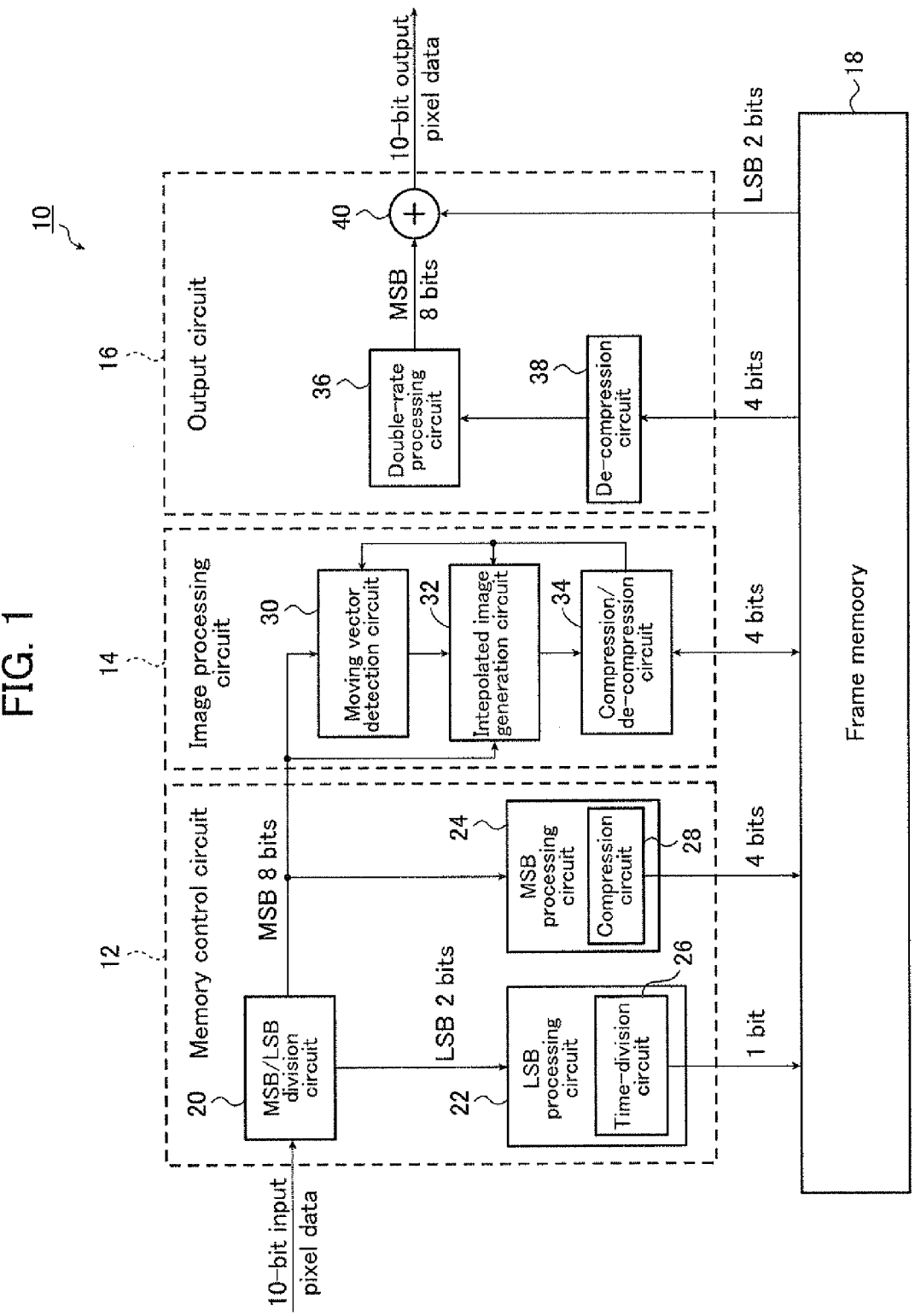
FIG. 1 is a block diagram of an image processing apparatus according to an exemplary embodiment of this disclosure.

FIG. 1 is a block diagram that shows a construction of first exemplary image processing apparatus according to this disclosure. The exemplary image processing apparatus 10 receives 10-bit input pixel data of pixels constituting a plurality of frames with 60 Hz/50 Hz input frame rate. The exemplary apparatus 10 performs double-rate conversion processing and outputs 10-bit output pixel data of pixels constituting a plurality of output frames with 120 Hz/100 Hz output frame rate. The exemplary image processing apparatus 10 includes memory control circuit 12, image processing circuit 14, and output circuit 16.

The input frame rate is not limited to 60 Hz/50 Hz, and output frame rate is not limited to 120 Hz/100 Hz. The frame rate conversion is not limited to 2-times upper conversion. The number of bits of the input and output pixel data may be more or less than 10 bits.

The exemplary image processing apparatus 10 shown in shown in FIG. 1 only includes an image processing circuit 14 for processing pixel data of pixels constituting frames of television image, which will be called as "television image pixel data" in this specification. However, the exemplary image processing apparatus 10 may also include an image processing circuit for processing pixel data of pixels constituting frames formed by 2:3/2:2 pull-down of movie frames of film source, which will be called as "film source pixel data" in this specification.

Although the following description will be limited to the case that television image pixel data is input to the image processing apparatus 10, the image processing apparatus 10 may operate similarly when film source pixel data is input.

The memory control circuit 12 receives 10-bit input pixel data. That is, the memory control circuit 12 receives a plurality of pixel data each representing a value of each of a plurality of pixels that constitute each of a plurality of frames, in a sequence of the frames, and stores the received pixel data in the frame memory 18. The "value" of the pixel may be, for example, a gray scale value of each of R, G, and B primary colors, or each of a luminance (Y) and chrominance (U and V) values of each of the pixels. The memory control circuit 12 includes MSB/LSB dividing circuit 20, LSB processing circuit 22, and MSB processing circuit 24.

The MSB/LSB dividing circuit 20 divides the 10-bit pixel data into upper bit portion, which includes upper 8 bits of the 10-bit pixel data from the most significant bit (MSB), and lower bit portion, which includes 2 bits of the 10-bit pixel data from the least significant bit (LSB). The exemplary image processing apparatus 10 generates upper 8-bit portions of interpolated pixel data by using the upper 8-bit portions of the input pixel data. The exemplary image processing apparatus 10 further outputs 10-bit pixel data generated by adding the upper 8-bit portion of the interpolated pixel data and the lower 2-bit portion of the input pixel data.

The MSB/LSB dividing circuit 20 may divide the pixel data into upper bit and lower bit portions with various numbers of bits.

The LSB processing circuit 22 divides the lower bit portions of pixel data of a plurality of pixels constituting each of the frames into two groups: a group of lower bit portions of odd-numbered pixels and a group of lower bit portions of even-numbered pixels. Then, the LSB processing circuit 22 alternately stores, during each of periods of receiving two successive frames, or during each of two successive frame periods, the lower bit portions of one of the even-numbered and odd-numbered pixels in the frame memory 18.

Figure 2:
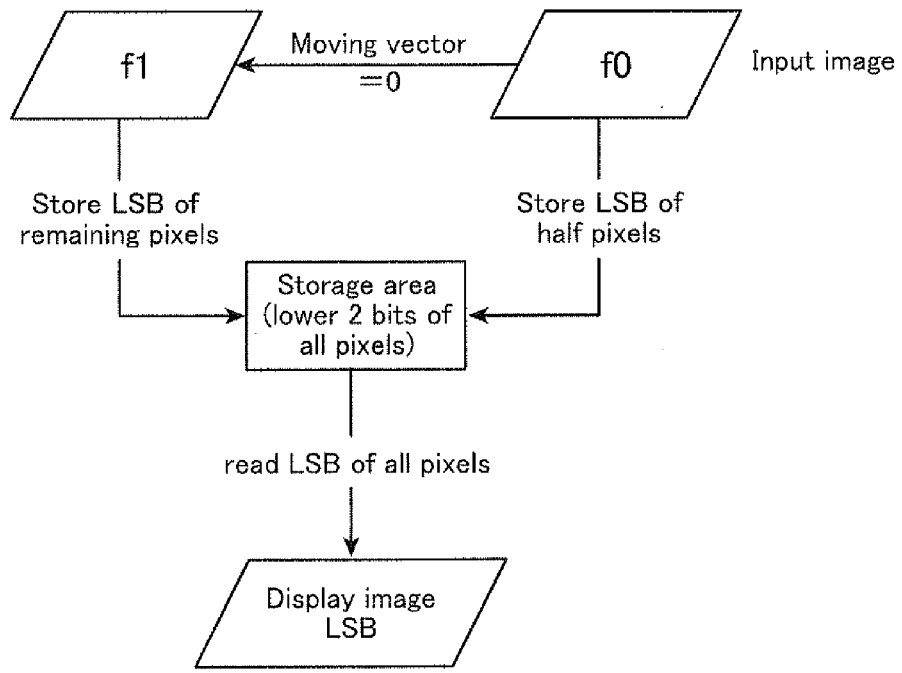
FIG. 2 is a schematic drawing that shows exemplary timings of storing lower bit portions of pixel data in a frame memory.

That is, as shown in FIG. 2, lower bit portions of only a half of the pixels in a frame are stored in the frame memory during each frame period. In an example shown in FIG. 2, lower bit portions of half of the pixels, e.g., odd-numbered pixels, in frame f0 are stored in the frame memory during a period of receiving pixels of frame f0, and lower bit portions of remaining pixels, e.g., even-numbered pixels, in frame f1 are stored in the frame memory during a period of receiving pixels data of frame f1.

Accordingly, for the lower 2-bit portions among the 10-bit pixel data, pixel data of a half of the pixels in a frame are stored during a frame period of receiving pixel data of pixels constituting frame f0, and pixel data of a remaining half of the pixels in a frame are stored during a frame period of receiving pixel data of pixels constituting the following frame f1. As a result, pixel data of pixels of a whole frame are stored in the frame memory 18 during two succeeding frame periods. The lower 2-bit portions of pixel data of pixels constituting a whole frame stored during the period of two successive frames are read and used for displaying the image.

Figure 3:
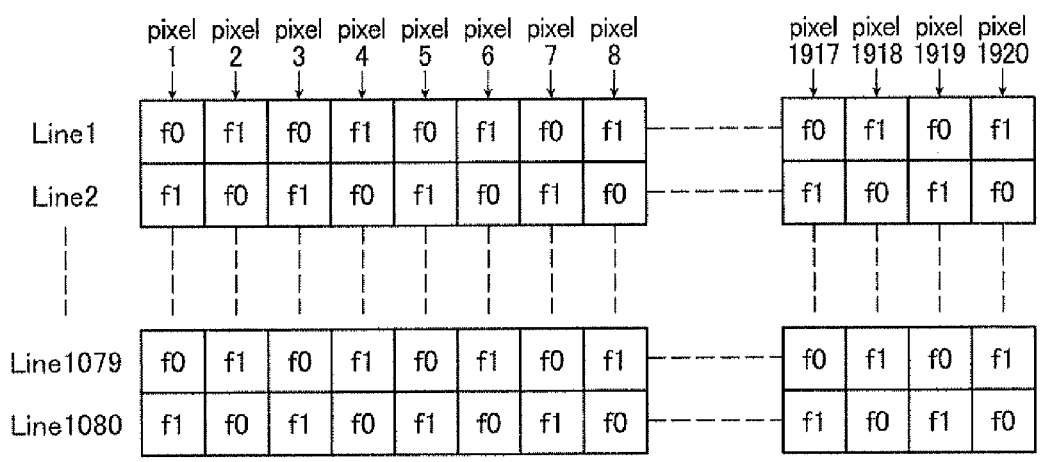
FIG. 3 is a schematic drawing that shows exemplary construction of lower bit portions of pixel data stored in a frame memory.

In another example shown in FIG. 3, each frame has even-number of pixels in both of the horizontal and the vertical directions, e.g., 1920×1080 pixels. The lower 2-bit portions of pixel data of odd-numbered pixels or even-numbered pixels in each of the lines are stored in the frame memory 18 during the frame period of f0 or f1.

In the example shown in FIG. 3, in odd-numbered lines, lower 2-bit portions of pixel data of odd-numbered pixels and even-numbered pixels are stored during frame periods of even-numbered frame f0 and odd-numbered frame f1, respectively. In even-numbered lines, on the other hand, lower 2-bit portions of pixel data of even-numbered pixels and odd-numbered pixels are stored during frame periods of even-numbered frame f0 and odd-numbered frame f1, respectively. That is, pixels of which lower bit portions of pixel data are stored during frame periods of even-numbered frame f0 and odd-numbered frame f1 are interchanged in respective lines.

It is not necessary to interchange the pixels of which lower bit portions of pixel data are stored in respective lines. For example, it is also possible to store the lower bit portions of pixel data of all odd-numbered pixels and all even-numbered pixels during frame periods of even-numbered frame f0 and odd-numbered frame f1, respectively. Interchanging the pixels of which lower bit portions of pixel data are stored in respective lines may improve the display quality when displaying an image having a small movement. However, there is no noticeable difference in the display quality when displaying still images having no movement or images having large movements.

In either case, number of pixels of which lower bit portions of pixel data are stored during each frame period is halved. Accordingly, a memory capacity of the frame memory 18 required for storing lower two bit portions of pixel data is halved.

When there is no movement from frame f0 to f1, the pixel data of respective pixels in frame 10 are the same as the pixel data of corresponding pixels in frame f1. Accordingly, lower 2-bit portions of pixel data of all pixels constituting frames f0 and f1 can be completely restored by reading lower 2-bit portions of pixel data of halves of pixels in frames f0 and f1 stored in the frame memory 18, without requiring lower 2-bit portions of pixel data of the other halves of the pixels in the frames f0 and f1.

In the example shown in FIG. 3, the LSB processing circuit 22 divides the pixels constituting a frame into two groups: odd-numbered pixels in odd-numbered lines and even-numbered pixels in even-numbered lines into a first group, and even-numbered pixels in odd-numbered lines and odd-numbered pixels in even-numbered lines into a second group. However, the LSB processing circuit 22 may divide the pixels constituting a frame in various other groups. Further, the LSB processing circuit 22 may divides pixels constituting a frame into n groups, where n is an integer equal to or larger than 2, and successively store lower bit portions of pixel data of pixels in respective groups in the frame memory 18 during n successive frame periods. In this case, the memory capacity of the frame memory 18 required for storing lower bit portions of pixel data is reduce to 1/n.

Alternatively, the LSB processing circuit 22 may divide each of the lower bit portions into n unit portions each including at least one bit, where n is an integer equal to or larger than 2, and successively store respective divided unit portions in the frame memory 18 during frame periods of n successive frames.

When the lower bit portion includes 2 bits including bit 1 and bit 2, for example, the LSB processing circuit 22 may divide each of the lower bit portions into two unit portions including the bit 1 and bit 2, respectively. Then, the LSB processing circuit 22 may successively store respective unit portions including the bit 1 and bit 2 in the frame memory 18 during frame periods of two successive frames.

The LSB processing circuit 22 may divide the lower bit portion in various other ways. In any event, it is possible to reduce required memory capacity of the frame memory for storing the lower bit portions of pixel data to 1/n by dividing the lower bit portions in n divided unit portions.

The LSB processing circuit 22 further includes a time-division circuit 26 that outputs the bits of the lower 2-bit portion in time-division manner, i.e., outputs each of the bits of the lower 2-bit portion during each clock cycle. The frame memory 18 successively stores bits of the lower bit portion received from the time-division circuit 26. Accordingly, the bandwidth of the memory bus for supplying the lower bit portion to the frame memory 18 may be halved.

When the lower bit portion includes n bits and the time-division circuit outputs each of the bits of the lower bit portion during each clock cycle, the bandwidth of the memory bus for storing the lower bit portion may be reduced to 1/n. When the lower bit portion includes m×n bits, where m is an integer equal to or larger than 1, and the time-division circuit outputs m bits of the lower bit portion during each clock cycle, the bandwidth of the memory bus for storing the lower bit portion may also be reduced to 1/n.

The bandwidth may also be reduced to 1/n by dividing each of the lower bit portions into n unit portions and successively storing respective divided unit portions in the frame memory during frame periods of n successive frames. In this case, the time-division circuit is not required.

Figure 4:
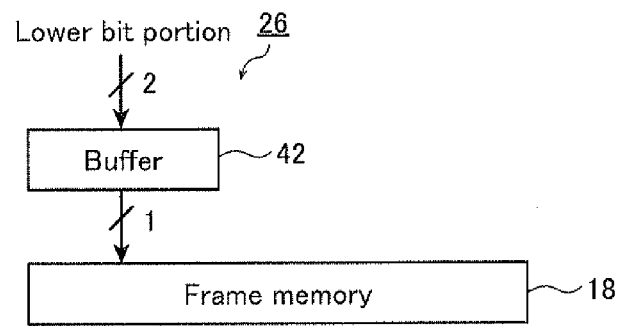
FIG. 4 is a block diagram that shows an exemplary construction of LSB processing circuit.

The time-division circuit 26 may include buffer 42, for example, as shown in FIG. 4. The time-division circuit 42 receives the lower 2-bit portion of the pixel data and outputs the lower 2-bit portion in time-division manner, i.e., successively outputs bit 1 and bit 2 of the lower 2-bit portion. The memory area of the frame memory 18 to store bit 1 and bit 2 of the pixel data may be selected by altering the address signal.

The MSB processing circuit 24 includes compression circuit 28 that compresses the divided upper 8-bit portion of the pixel data into 4-bit compressed data. The MSB processing circuit stores the compressed data in the frame memory 18.

The compression circuit 28 may compresses the upper bit portions by using various known compression techniques. The compression circuit 28 may compress the upper 8-bit portion into compressed data with various numbers of bits.

The image processing circuit 14 includes moving vector detection circuit 30, interpolated image generation circuit 32, and compression/de-compression circuit 34. The image processing circuit 14 performs image processing using pixel data stored in the frame memory 18 and generates processed pixel data, or interpolated pixel data. That is, the image processing circuit 14 generates pixel data each representing a value of each of a plurality of pixels that constitute each of interpolated frames that interpolate between respective adjacent frames.

The moving vector detection circuit 30 compares upper 8-bit portions of the pixel data of the current frame input from the MSB/LSB division circuit 20 and upper 8-bit portions of the pixel data of the previous frame input from the compression/de-compression circuit 34. Thereby, the moving vector detection circuit 30 detects moving vectors of the current frame, which represent movements from the previous frame to the current frame.

The interpolated image generation circuit 32 performs, based on moving vectors from the previous frame to the current frame input from the moving vector detection circuit 30, interpolation processing from upper 8-bit portions of current frame pixel data and upper 8-bit portions of previous frame pixel data. The interpolation processing generates 8-bit pixel data of the interpolated frame, or the interpolated image, between the previous frame and the current frame.

The moving vector detection circuit can detect the moving vector in various know ways, and the interpolated image generation circuit can generate the interpolate image data in various known ways.

Similar to the compression circuit 28 in the MSB processing circuit 24, the compression/de-compression circuit 34 compresses 8-bit interpolated pixel data input from the interpolated image generation circuit 32 into 4-bit compressed pixel data and stores the 4-bit compressed pixel data in the frame memory. The compression/de-compression circuit 34 further de-compresses 4-bit compressed pixel data of the previous frame input from the frame memory 18 into 8-bit pixel data. The de-compressed 8-bit pixel data of the previous frame is input to the moving vector detection circuit 30 and the interpolated image generation circuit 32.

The output circuit 16 includes double-rate processing circuit 36, de-compression circuit 38, and adder 40. The output circuit 16 outputs 10-bit pixel data, which includes input pixel data and processed pixel data, after the double-rate conversion processing.

Similar to the compression/de-compression circuit 34 in the image processing circuit 14, the de-compression circuit 38 de-compresses 4-bit compressed data input from the frame memory 18, which corresponds to upper 8-bit portions of the input pixel data or 8-bit interpolated pixel data, into 8-bit pixel data.

The double-rate processing circuit 36 alternately outputs upper 8-bit portions of the input pixel data and upper 8-bit portions of the interpolated pixel data received from the de-compression circuit 38 in a predetermined order with an output frame rate. Accordingly, the double-rate processing circuit 36 outputs upper 8-bit portions of output pixel data, which is generated by the double-rate conversion processing of input pixel data.

The adder 40 adds upper 8-bit portion of each of the pixel data input from the double-rate processing circuit 36 and lower 2-bit portion of corresponding one of the input pixel data input from the frame memory, and outputs 10-bit output pixel data.

That is, the output circuit 16 adds upper 8-bit portion of one of the input pixel data and the interpolated pixel data generated by the image processing circuit 14, and lower 2-bit portion of the input pixel data read from the frame memory 18. Thereby, the output circuit 16 outputs generated 10-bit output pixel data, which is one of the input pixel data and the interpolated pixel data.

Next, relationship between input television image pixel data and output pixel data will be explained.

Figure 5:
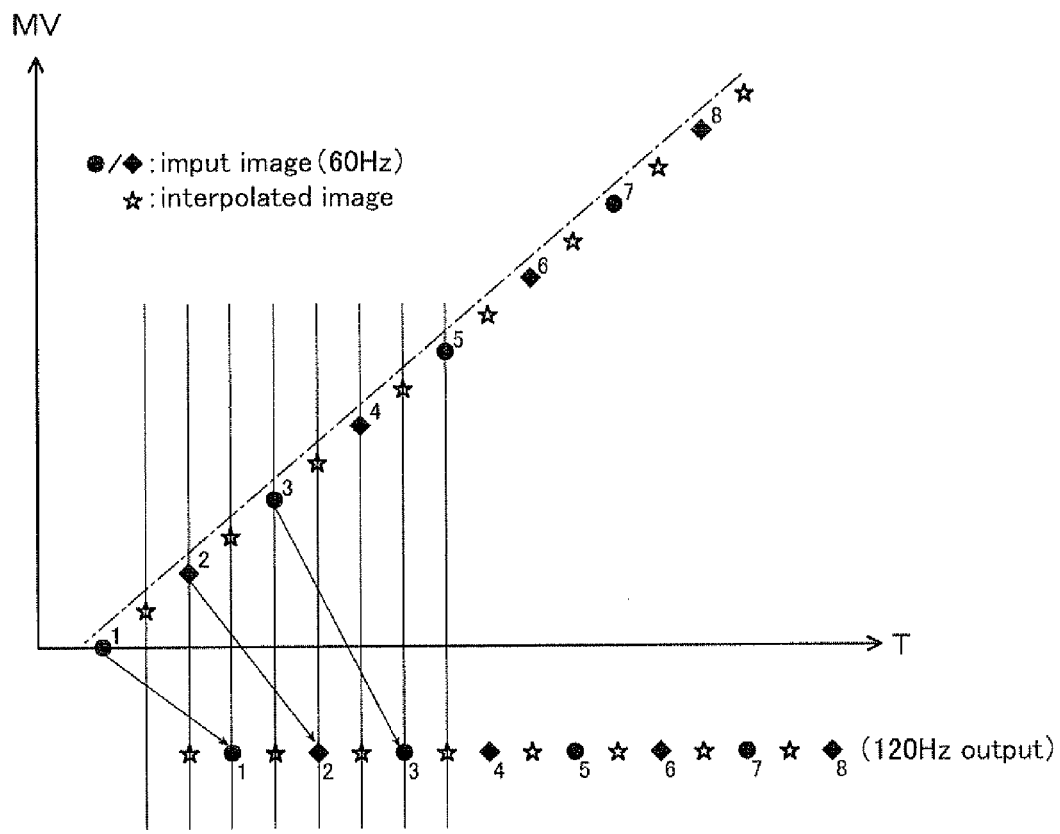
FIG. 5 is a graph that shows relationship between input pixel data in respective frames of television image and output pixel data in respective frames after a double-rate conversion.

FIG. 5 is a graph that shows a relationship between input television image pixel data and output pixel data after the double-rate conversion. The vertical axis of the graph represents movement (MV) of the input image, and the horizontal axis of the graph represents time (T) with a unit of a frame period. That is, the graph shows that the input image moves from the bottom-left to the upper-right. The closed circles and closed squares represent frames of input images, stars represent frames of interpolated images. The bottom of the graph shows arrangement of frames of output images. The vertical lines with an interval of the frame period are shown to improve the visibility. The numbers 1, 2, 3, . . . represent correspondences between input and output frames.

As shown in the graph, the television image pixel data is input with a frame rate of, for example, 60 Hz. That is, pixel data of pixels constituting respective frames of television image data, which are represented by closed circles and closed squares, are input in each frame period of 1/60 s. On the other hand, output pixel data is output with an output frame rate of 120 Hz. In the example shown in the graph, the image processing apparatus starts outputting output pixel data after a delay of 3 output frame periods from the start of inputting input pixel data.

When the television image pixel data is input, the image processing apparatus 10 repeats successively outputting of 1) a frame of first input pixel data represented by a closed circle, 2) a frame of first interpolated pixel data represented by an open star, 3) a frame of second input pixel data represented by a closed square, and 4) a frame of second interpolated pixel data represented by an open star.

Next, operation of the image processing apparatus 10 will be explained.

Figure 6:
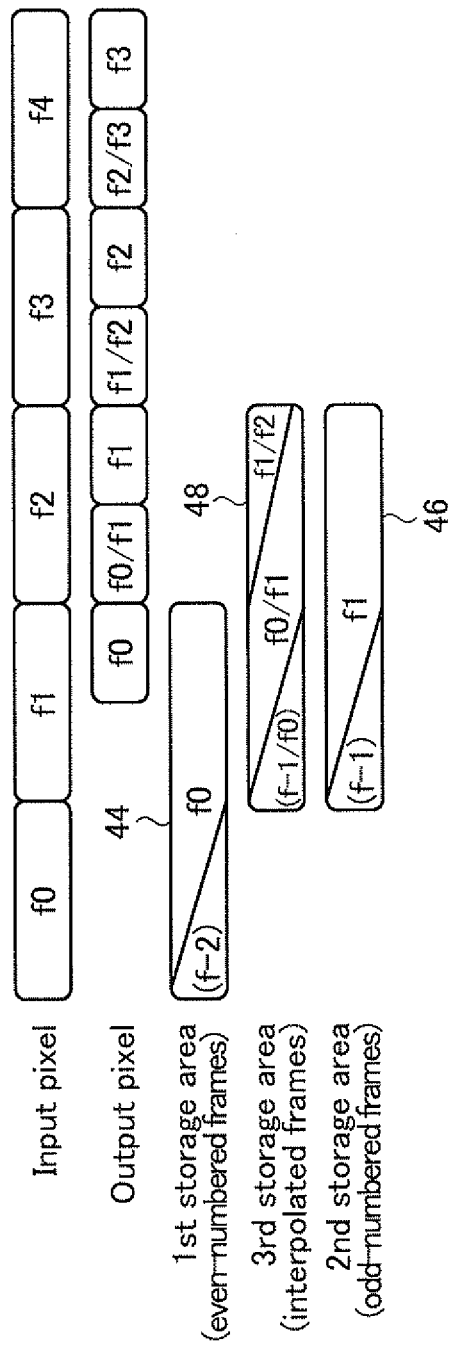
FIG. 6 is a schematic diagram that shows an operation of the exemplary image processing apparatus when pixel data of television image in input.

As shown in FIG. 6, the image processing apparatus 10 receives a plurality of 10-bit pixel data of each of a plurality of pixels that constitute each of a plurality of frames in an order of frames f0, f1, f2, f3, f4, . . . with an input frame rate. The frame memory may include first storage area 44 for storing pixel data of pixels constituting even-numbered frames f0, f2, f4, . . . and second storage area 46 for storing pixel data of pixels constituting odd-numbered frames f1, f3, f5, . . . . Each of the first and second storage areas 44 and 46 may have a storage capacity for storing 5 bits per pixel, which includes 4 bits for storing 4-bit compressed data generated by compressing upper 8-bit portion of pixel data and 1 bit for storing lower 2-bit portion of the pixel data. As explained above, the image processing apparatus 10 enables to halves the memory capacity for storing the lower bit portion of the pixel data.

The frame memory 18 may further include third storage area 48 for storing 4-bit compressed data generated by compressing 8-bit interpolated pixel data generated by the interpolated image generation circuit 32. The operation of the image processing apparatus will be explained assuming that the frame memory 18 has these three storage areas.

10-bit pixel data of pixels constituting respective frames f0, f1, f2, 13, f4 . . . are input in an order of the frames. The MSB/LSB dividing circuit 20 divides the 10 bit pixel data of each of the pixels into upper 8-bit portion and lower 2-bit portion.

The LSB processing circuit 22 divides pixels constituting each of the lines in each of the frames into two groups, e.g., odd-numbered pixels into a first group and even-number pixels into a second group. During each of the frame periods, the LSB processing circuit 22 stores the lower bit portions of pixel data of pixels in only one of the groups. Specifically, the LSB processing circuit stores the lower 2 bits of the pixel data in time-division manner in corresponding storage areas of the frame memory 18.

Accordingly, lower bit portions of pixel data of pixels constituting a whole frame are stored in the frame memory in two successive frame periods.

In the example shown in FIG. 3, for example, the LSB processing circuit 22 stores, among lower bit portions of pixel data input during a frame period of even-numbered frame f0, lower bit portions of pixel data of odd-numbered pixels in odd-numbered lines and lower bit portions of pixel data of even-numbered pixels in even-numbered lines in the first storage area 44 of the frame memory 18. The stored lower bit portions are maintained in the frame memory 18 until the pixel data of frame f2 is input.

Then, the LSB processing circuit 22 stores, among lower bit portions of pixel data input during a frame period of odd-numbered frame f1, which is next to the even-numbered frame f0, lower bit portions of pixel data of even-numbered pixels in odd-numbered lines and lower bit portions of pixel data of odd-numbered pixels in even-numbered lines in the second storage area 46 of the frame memory 18. The lower bit portions stored during the frame period of frame f1 are maintained in the frame memory 18 until the pixel data of frame f3 is input. The lower bit portions are successively stored in the frame memory in the same manner during following frame periods.

On the other hand, the MSB processing circuit 24 compresses upper 8-bit portion of the pixel data into 4-bit data, and successively stores the compressed 4-bit data of pixels constituting respective frames in corresponding storage areas of the frame memory 18.

For example, the upper 8-bit portions of pixel data input during a frame period of frame f0 are stored during the same frame period in the first storage area 44 of the frame memory 18, and maintained until the pixel data of frame f2 is input. Next, the upper 8-bit portions of the pixel data input during a frame period of frame f1 is stored during the same frame period in the second storage area 46 of the frame memory 18, and maintained until the pixel data of frame f3 is input. The upper portions of pixel data are successively stored in the same manner during following frame periods.

The upper 8-bit portions are also input to the moving vector detection circuit 30 and the interpolated image generation circuit 32.

The moving vector detection circuit 30 detects the moving vectors between a previous frame and a current frame during a frame period of the current frame, i.e., during a period of receiving pixel data constituting the current frame. Specifically, the moving vector detection circuit 30 compares upper 8-bit portions of pixel data of pixels constituting the current frame and upper 8-bit portions of pixel data of pixels constituting the previous frame read from the frame memory 18 and de-compressed by the compression/de-compression circuit 34. Thereby the moving vector detection circuit 30 generates the moving vectors.

For example, during a frame period f1 of receiving the pixel data of frame f1, the moving vector detection circuit 30 compares upper 8-bit portions of pixel data of pixels constituting frame f1 and upper 8-bit portions of pixel data of pixels constituting frame f0 and detects moving vectors between frame f0 and f1.

Then, the interpolated image generation circuit 32 generates upper 8-bit portions of pixel data of pixels constituting an interpolated frame between the previous frame and the current frame. Specifically, the interpolated image generation circuit 32 generates upper 8-bit portions of pixel data of the interpolated frame from upper 8-bit portions of pixel data of the previous frame and upper 8-bit portions of pixel data of the current frame in accordance with the moving vectors between the previous and current frames. The compression/de-compression circuit 34 compresses the upper 8-bit portions of the interpolated pixel data into 4-bit compressed data and stores the compressed data in a corresponding storage area of the frame memory 18.

For example, as shown in FIG. 6, during a frame period f1 of inputting pixel data of frame f1, the interpolated image generation circuit 32 generates upper 8-bit portions of pixel data of pixels constituting an interpolated frame f0/f1 between the frames f0 and f1 from upper 8-bit portions of pixel data of pixels of frames f0 and f1 in accordance with moving vectors between the frames f0 and f1. The upper 8-bit portions of pixel data of pixels constituting the interpolated frame f0/f1 is compressed into 4-bit compressed data and stored in the third storage area 48 of the frame memory 18.

Then, during the frame period f2 of inputting pixel data of pixels of the next frame f2, the interpolated image generation circuit 32 generates upper 8-bit portions of pixel data of pixels constituting an interpolated frame f1/f2 between the frames f1 and f2 from upper 8-bit portions of pixel data of pixels of frames f1 and f2 in accordance with moving vectors between the frames f1 and f2. The upper 8-bit portions of pixel data of the interpolated frame f1/f2 is compressed into 4-bit compressed data and stored in corresponding storage area of the frame memory 18.

In the example shown in FIG. 6, the upper 8-bit portions of pixel data of pixels constituting the interpolated frame f1/f2 is stored in the same third storage area 48 of the frame memory 18. That is, the upper 8-bit portions of pixel data of pixels constituting the interpolated frame f1/f2 overwrite the upper 8-bit portions of pixel data of pixels constituting the interpolated frame f0/f1 in the third storage area 48. The same procedures are repeated during following frame periods.

In the example shown in FIG. 6, the double-rate processing circuit 36 starts outputting upper 8-bit portions of the input pixel data after a delay of 3 output frame periods after the start of inputting pixel data of the first frame f0. Thereafter, the double-rate processing circuit 36 successively outputs upper 8-bit portions of the input pixel data and interpolated pixel data, which are read from the frame memory 18 and de-compressed by the de-compression circuit 38, in a predetermined order with the output frame rate.

The adder 40 adds upper 8-bit portions of the pixel data of pixels output from the double-rate processing circuit 36 and lower 2-bit portions of input pixel data of corresponding pixels read from the frame memory 18 and outputs 10-bit output pixel data. Accordingly, the image processing circuit 10 outputs 10-bit output pixel data of frames f0, f0/f1, f1, f1/f2, f2, . . . in the order.

As shown in FIG. 6, for example, input pixel data of pixels constituting frame f0 is stored by successively overwriting input pixel data of pixels constituting frame f-2 that is previously stored in the first storage area 44 of the frame memory 18. Similarly, input pixel data of pixels constituting frame f1 is stored by successively overwriting input pixel data of pixels constituting frame f-1 that is previously stored in the second storage area 46 of the frame memory 18. Further, pixel data of pixels constituting interpolated frame f0/f1 is stored by successively overwriting pixel data of pixels constituting interpolated frame f-1/f0 that is previously stored in the third storage area 48 of the frame memory 18.

During a frame period of outputting the output pixel data of frame f0, for example, input pixel data of pixels constituting frame f1 is written in the second storage area 46 of the frame memory 18 and, simultaneously, lower 2-bit portions of half of the pixels constituting frame f-1 are read from the same second storage area 46 of the frame memory. Then, during a frame period of outputting pixel data of the interpolated frame f0/f1, upper bit portions of pixel data of pixels constituting the interpolated frame f0/f1 is read from the third storage area 48 of the frame memory and, simultaneously, upper bit portions of pixel data of pixels constituting the interpolated frame f1/f2 are written in the same third storage area 48.

During the same frame period of outputting pixel data of the interpolated frame f0/f1, although not shown in FIG. 6, lower 2-bit portions of pixel data of half of the pixels constituting frame f0 are read from the first storage area 44 of the frame memory and, simultaneously, input pixel data of pixels constituting frame f2 is written in the same first storage area 44.

Figure 7:
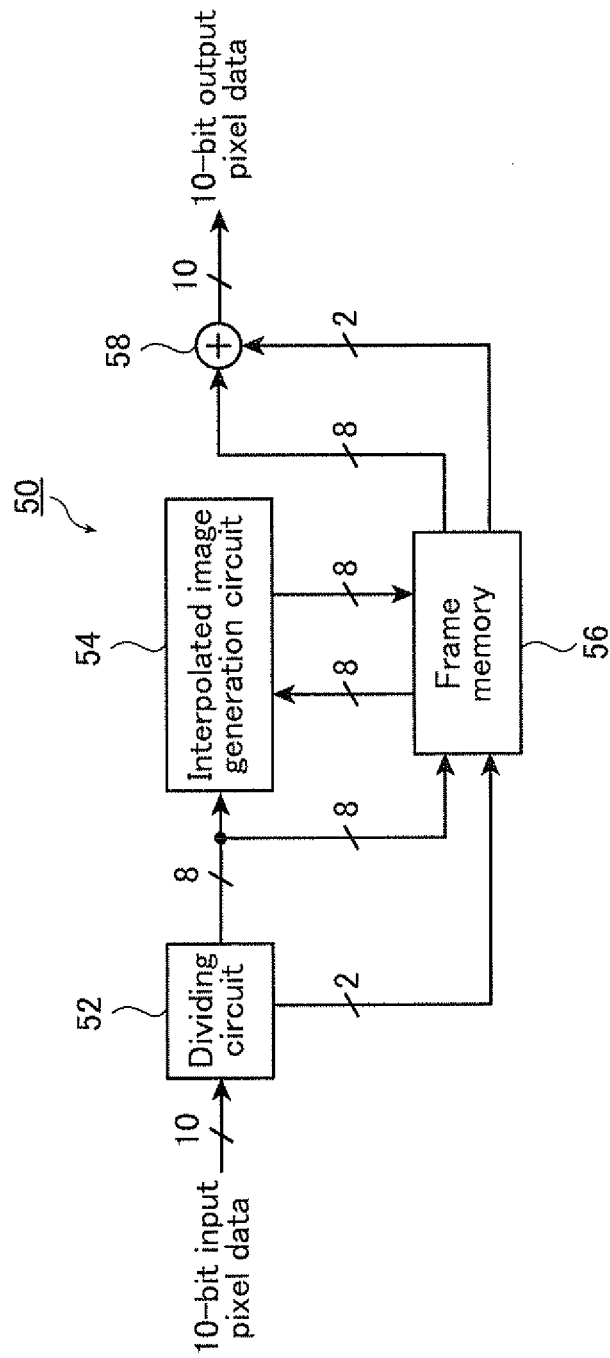
FIG. 7 is a block diagram of an exemplary conventional image processing apparatus.

A technique shown in FIGS. 7 and 8 of Japanese laid-open patent No. 2009-169257, which was filed by the same applicant, may be used to simultaneously read from and write in the same storage area of the frame memory. That is, read- and write-FIFO (first-in first-out memory) may be provided and reading from and writing in the frame memory are performed using a double-rate clock signal having two-times higher frequency than a frequency of a clock signal used for inputting the pixel data. Accordingly, reading of pixel data of pixels constituting a line of the previous frame and wiring of pixel data of pixels constituting the same line of the current frame can be performed during first- and second halves, respectively, of a period of receiving the pixel data of pixels constituting the line of the current frame by using a standard SDRAM.

Lower 2-bit portions of 10-bit interpolated pixel data output from the image processing apparatus 10 are not lower bit portions of interpolated pixel data but lower 2-bit portions of input pixel data of previous and current frames. However, human eyes cannot recognize lower 2-bit portions of moving images. Accordingly, it is possible to display moving images using 10-bit output data generated by the image processing apparatus 10 with satisfying quality.

When displaying still images, similarly, 10-bit interpolated pixel data output from the image processing apparatus includes lower 2-bit portions of input pixel data of the previous and the current frames. However, because input pixel data of the previous frame is identical to input pixel data of the current frame, lower 2-bit portion of input pixel data is also identical to lower 2-bit portion of interpolated pixel data. Accordingly, it is possible to display still images with high precision.

Upper 8-bit portions of pixel data may be compressed with a compression ratio of 50%, i.e., may be compressed into 4-bit compressed data. Further, only a half of lower 2-bit portions of pixel data are stored. Accordingly, a total number of bits of stored pixel data is 5, i.e., a total compression ratio as high as 50% is achieved.

While the invention of this disclosure has been described with reference to specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. An image processing apparatus, comprising:
   a memory control circuit that receives a plurality of pixel data each representing a value of each of a plurality of pixels that constitute each of a plurality of frames during each of a plurality of frame periods and stores the plurality of pixel data in a frame memory;
   an image processing circuit that processes the plurality of pixel data stored in the frame memory to generate a plurality of processed pixel data; and
   an output circuit that outputs the plurality of processed pixel data, wherein
   the memory control circuit includes a dividing circuit that divides each of the plurality of pixel data into an upper bit portion and a lower bit portion other than the upper bit portion to generate a plurality of upper bit portions and a plurality of lower bit portions of the plurality of pixel data, an upper bit processing circuit that stores the upper bit portions in the frame memory, and a lower bit processing circuit that stores the lower bit portions in the frame memory;
   the image processing circuit generates the plurality of processed pixel data by using the upper bit portions of the plurality of pixel data stored in the frame memory; and
   the lower bit processing circuit stores the lower bit portions in the frame memory by:
   (i) dividing the lower bit portion of each of the plurality of pixel data into n unit portions, each unit portion including a different bit of the lower bit portion, n being an integer larger than one, and storing in the frame memory, during each frame period of n successive frame periods, a different unit portion of the n unit portions of each of the plurality of pixel data; or
   (ii) dividing the plurality of pixels constituting each of the plurality of frames into n groups, and storing in the frame memory during each frame period of n successive frame periods, the lower bit portions of the plurality of pixel data that represent the values of the plurality of pixels in a different group of the n groups.

2. The image processing apparatus according to claim 1, wherein
the lower bit processing circuit includes a time-division circuit that stores the lower bit portion of each of the plurality of pixel data that represent the values of the plurality of pixels in a corresponding one of the n groups in the frame memory in a time-division manner.

3. The image processing apparatus according to claim 1, wherein
the image processing circuit generates an upper bit portion of each of the plurality of processed pixel data; and
the output circuit includes an adder that adds the upper bit portion of each of the plurality of processed pixel data and the lower bit portion of corresponding one of the plurality of pixel data read from the frame memory before the output circuit outputs each of the plurality of processed pixel data.

4. The image processing apparatus according to claim 1, wherein
the upper bit processing circuit further includes a compression circuit that compresses the upper bit portions and stores compressed upper bit portions in the frame memory.

5. The image processing apparatus according to claim 4, wherein the lower bit processing circuit stores the lower bit portions without compression.

6. The image processing apparatus according to claim 1, wherein
the image processing circuit generates a plurality of interpolated pixel data, each representing a value of each of a plurality of pixels constituting each of a plurality of interpolated frames that interpolate between the plurality of frames as the plurality of processed pixel data.

7. The image processing apparatus according to claim 6, wherein the image processing circuit generates upper bit portions of the plurality of interpolated pixel data by using the upper bit potions of the plurality of pixel data of two successive frames of the plurality of frames.

8. A method of image processing, comprising:
receiving a plurality of pixel data each representing a value of each of a plurality of pixels that constitute each of a plurality of frames during each of a plurality of frame periods and storing the plurality of pixel data in a frame memory;
processing the plurality of pixel data stored in the frame memory to generate a plurality of processed pixel data; and
outputting the plurality of processed pixel data, wherein
the storing includes dividing each of the plurality of pixel data into an upper bit portion and a lower bit portion other than the upper bit portion to generate a plurality of upper bit portions and a plurality of lower bit portions of the plurality of pixel data, storing the upper bit portions in the frame memory, and storing the lower bit portions in the frame memory;
the processing generates the plurality of processed pixel data by using the upper bit portions of the plurality of pixel data stored in the frame memory; and
the storing of the lower bit portions is performed by:
(i) dividing the lower bit portion of each of the plurality of pixel data into n unit portions, each unit portion including a different bit of the lower bit portion, n being an integer larger than one, and storing in the frame memory, during each frame period of n successive frame periods, a different unit portion of the n unit portions of each of the plurality of pixel data; or
(ii) dividing the plurality of pixels constituting each of the plurality of frames into n groups, and storing in the frame memory during each frame period of n successive frame periods, the lower bit portions of the plurality of pixel data that represent the values of the plurality of pixels in a different group of the n groups.

9. The methods according to claim 8, wherein
the storing of the lower bit portions includes storing the lower bit portion of each of the plurality of pixel data that represent the values of the plurality of pixels in a corresponding one of the n groups in the frame memory in a time-division manner.

10. The method according to claim 8, wherein
the generating generates an upper bit portion of each of the plurality of processed pixel data; and
the outputting includes adding the upper bit portion of each of the plurality of processed pixel data and the lower bit portion of corresponding one of the plurality of pixel data read from the frame memory before outputting each of the plurality of processed pixel data.

11. The method according to claim 8, wherein
the storing of the upper bit portions includes compressing the upper bit portions and storing compressed upper bit portions in the frame memory.

12. The method according to claim 8, wherein the processing includes generating a plurality of interpolated pixel data each representing a value of each of a plurality of pixels constituting each of a plurality of interpolated frames that interpolate between the plurality of frames as the plurality of processed pixel data.

13. A system for image processing, comprising:
a frame memory;
a memory control circuit that receives a plurality of pixel data each representing a value of each of a plurality of pixels that constitute each of a plurality of frames during each of a plurality of frame periods and stores the plurality of pixel data in a frame memory;
an image processing circuit that processes the plurality of pixel data stored in the frame memory to generate a plurality of processed pixel data; and
an output circuit that outputs the plurality of processed pixel data, wherein
the memory control circuit includes a dividing circuit that divides each of the plurality of pixel data into an upper bit portion and a lower bit portion other than the upper bit portion to generate a plurality of upper bit portions and a plurality of lower bit portions of the plurality of pixel data, an upper bit processing circuit that stores the upper bit portions in the frame memory, and a lower bit processing circuit that stores the lower bit portions in the frame memory;
the image processing circuit generates the plurality of processed pixel data by using the upper bit portions of the plurality of pixel data stored in the frame memory; and
the lower bit processing circuit stores the lower bit portions in the frame memory by:
(i) dividing the lower bit portion of each of the plurality of pixel data into n unit portions, each unit portion including a different bit of the lower bit portion, n being an integer larger than one, and storing in the frame memory, during each frame period of n successive frame periods, a different unit portion of the n unit portions of each of the plurality of pixel data; or
(ii) dividing the plurality of pixels constituting each of the plurality of frames into n groups, and storing in the frame memory during each frame period of n successive frame periods, the lower bit portions of the plurality of pixel data that represent the values of the plurality of pixels in a different group of the n groups.

14. The system according to claim 13, wherein the lower bit processing circuit includes a time-division circuit that stores the lower bit portion of each of the plurality of pixel data that represent the values of the plurality of pixels in corresponding one of the n groups in the frame memory in a time-division manner.

15. The system according to claim 13, wherein
the image processing circuit generates an upper bit portion of each of the plurality of processed pixel data; and
the output circuit includes an adder that adds the upper bit portion of each of the plurality of processed pixel data and the lower bit portion of corresponding one of the plurality of pixel data read from the frame memory before the output circuit outputs each of the plurality of processed pixel data.

16. The system according to claim 13, wherein
the upper bit processing circuit further includes a compression circuit that compresses the upper bit portions and stores compressed upper bit portions in the frame memory.

17. The system according to claim 13, wherein
the image processing circuit generates a plurality of interpolated pixel data each representing a value of each of a plurality of pixels constituting each of a plurality of interpolated frames that interpolate between the plurality of frames as the plurality of processed pixel data.

* * * * *